Aug. 22, 1961 J. HAFLIGER 2,996,857
MACHINE FOR APPLYING OBJECTS TO A SUPPORT MEMBER
Filed April 17, 1959 4 Sheets-Sheet 1

INVENTOR.
JOHN HAFLIGER
BY Hudson, Boughton,
Williams, David & Hoffmann
ATTORNEYS Aug. 22, 1961 J. HAFLIGER 2,996,857
MACHINE FOR APPLYING OBJECTS TO A SUPPORT MEMBER
Filed April 17, 1959 4 Sheets-Sheet 2

INVENTOR.
JOHN HAFLIGER
BY Hudson, Caughton,
Williams, David & Hoffmann
ATTORNEYS Aug. 22, 1961  J. HAFLIGER  2,996,857
MACHINE FOR APPLYING OBJECTS TO A SUPPORT MEMBER
Filed April 17, 1959  4 Sheets-Sheet 3

INVENTOR.
JOHN HAFLIGER
BY Hudson, Boughton,
Williams, David & Hoffmann
ATTORNEYS Aug. 22, 1961 J. HAFLIGER 2,996,857
MACHINE FOR APPLYING OBJECTS TO A SUPPORT MEMBER
Filed April 17, 1959 4 Sheets-Sheet 4
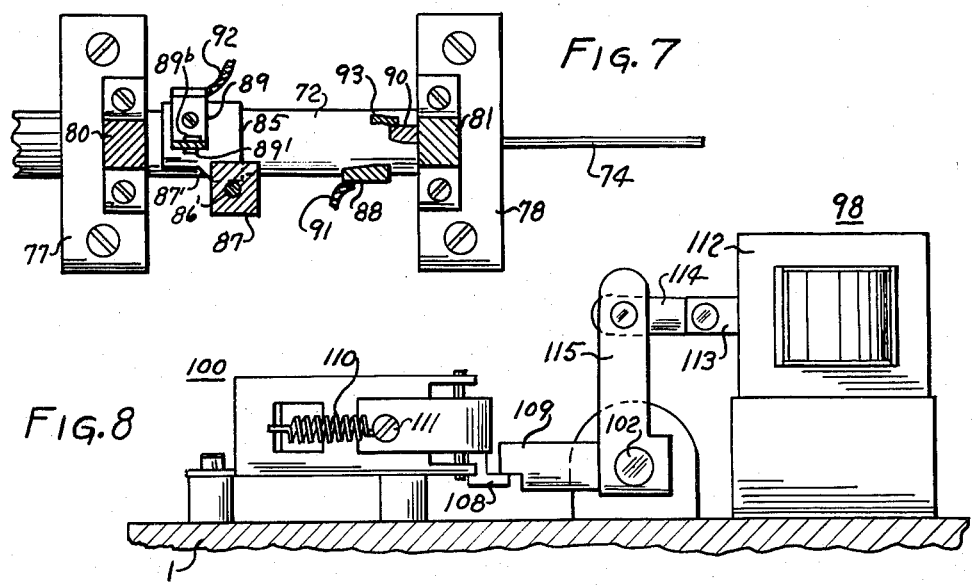
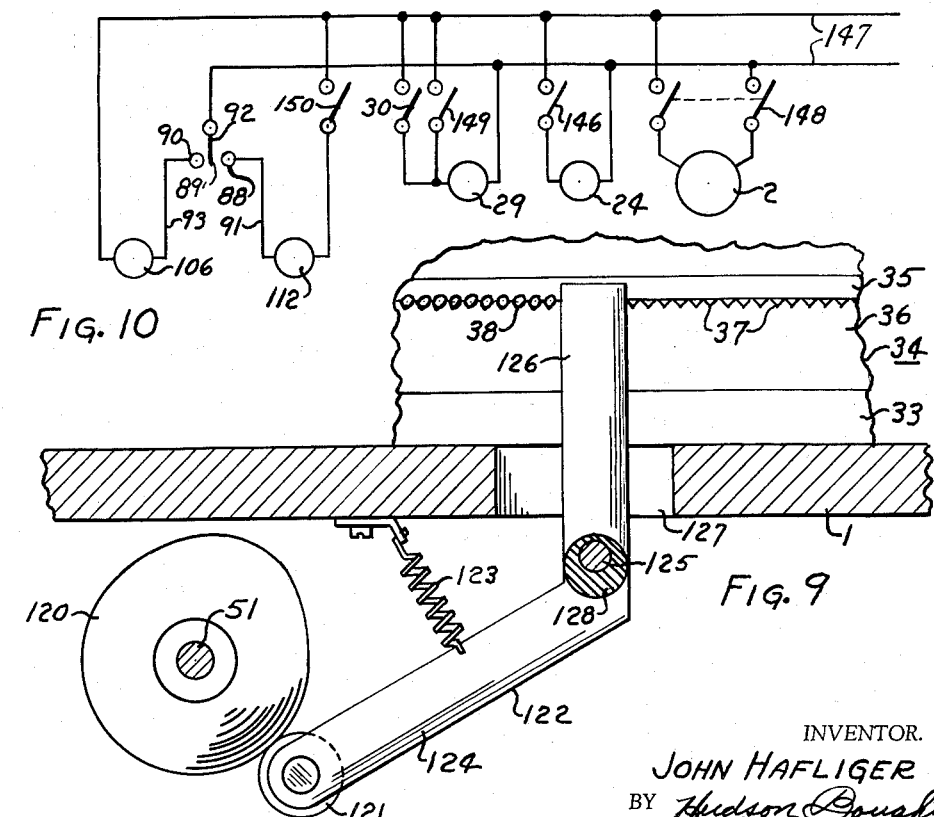
INVENTOR.
JOHN HAFLIGER
BY Hudson, Doughton,
Williams, David & Hoffmann
ATTORNEYS United States Patent Office 2,996,857
Patented Aug. 22, 1961

2,996,857
MACHINE FOR APPLYING OBJECTS TO A SUPPORT MEMBER
John Hafliger, New Philadelphia, Ohio, assignor to The Warner & Swasey Company, Cleveland, Ohio, a corporation of Ohio
Filed Apr. 17, 1959, Ser. No. 807,176
19 Claims. (Cl. 53—58)

This invention relates to a machine for applying objects to a support member and has particular relation to a machine for automatically inserting elongated pin-like objects into openings of a support member or jig in predetermined spaced relation.

According to the invention, a machine of improved construction is provided for automatically inserting objects such as pins into openings of a support member or jig in predetermined spaced relation. Although the machine has a number of applications, it is particularly suitable for insertion or setting of pins of the type employed in faller bars into jigs or books preparatory to application of the pins from the jig to faller bars. Methods of applying faller bar pins to faller bars are described in United States Patents Nos. 2,862,235 and 2,860,381.

In the present invention a machine is provided which includes feed means for feeding the pins from a pin storage area to an area wherein the pins are stacked vertically with the pin axes extending horizontally. In order to apply the pins to a jig or book the invention provides pusher means operable to successively push the pins from the stacking area into spaced notches of the jig which is displaceable along a horizontal axis extending transverse to the axes of the pins.

The machine includes further detector means provided for the purpose of periodically sensing the number of pins present at the pin stacking area. The machine is designed so that pins are fed to the stacking area at a rate greater than that at which the pins are ejected from the stacking area. The detector means is operable to discontinue the feeding operation if the number of pins which is detected at the stacking area is greater than a preselected number. The detector means is also operable to initiate the feeding operation if the detected number of pins is smaller than a preselected number. The detector means is conveniently operated in response to operation of the pusher means.

In order to effect movement of the jig or book the invention provides advancing means which is operable in timed relation with the pusher means to advance the jig a preselected distance subsequent to each pushing operation to present a vacant notch to the pin stacking area for receiving a pin in response to the next pushing operation. The advancing means is arranged to advance the jig only when a pin has been successfully inserted in the jig as a result of the preceding pushing operation.

In a preferred embodiment of the invention the advancing means includes a part which is periodically movable to engage the previously inserted pin to advance the jig the required distance. The advancing part is conveniently mounted for pivotal movement about an axis to advance the jig.

Means are also provided for effecting adjustment of the advancing means to permit a variation of the distance by which the jig may be advanced. Such means is conveniently manually operable and permits the employment of pins of various sizes and also jigs having pin receiving openings spaced by various distances. The adjusting means is conveniently operable to adjust the axis of pivotal movement of the advancing part for adjusting the distance of advancement.

The mechanisms in the machine, including the feed, pusher, advancing and detector means are driven from a common rotatable shaft which may be driven in any suitable manner. This shaft is preferably driven from a main shaft which is driven by suitable motor means. A suitable clutch arrangement is employed to permit the connection and disconnection of the motor and the main shaft. This clutch is controlled by a pair of suitable control devices which conveniently may be electrically energizable. One of the control devices is energizable in response to the completion of the pin setting operation to disengage the clutch for terminating rotation of the main shaft. The clutch may also be disengaged in the event of emergency by manual operation of a switch effective to energize the control device. The other control device is energizable to engage the clutch for connecting the motor and the main shaft. This other device is conveniently energizable by manual actuation of a suitable switch.

In order to permit the release of mechanisms which may become jammed during operation of the machine there is provided manually operable means for effecting rotation of the main shaft independently of the motor. The releasing means is preferably operated subsequent to disengagement of the main clutch for releasing the jammed mechanism.

It is therefore an object of the present invention to provide a machine of improved construction for automatically applying objects to a support member in predetermined spaced relation.

It is a further object of the invention to provide a machine of improved construction for automatically inserting faller bar pins into a jig or book in predetermined spaced relation.

It is another object of the invention to provide a machine for automatically applying objects to a support member including pusher means for pushing the objects into the support member and advancing means for advancing the support member relative to the pusher means a preselected distance subsequent to each pushing operation.

It is a further object of the invention to provide a machine as defined in the preceding object wherein the advancing means operates to advance the support member only when an object has been applied to the support member in response to the previous pushing operation.

It is still another object of the invention to provide a machine as defined in the next preceding object wherein the pusher and advancing means are operated from a common motor driven shaft with manually actuatable means for rotating the shaft independently of the motor.

It is still another object of the invention to provide a machine for supplying objects to a support member including means for pushing the objects into the support member with means for advancing the support member relative to the pusher means a preselected distance subsequent to each pushing operation and means for adjusting the advancing means to vary the distance by which the support member may be advanced.

It is a further object of the invention to provide a machine for applying objects to a support member with means for feeding the objects from a storage area to an area wherein the objects are arranged in predetermined relation with detector means for controlling operation of the feed means in accordance with the number of objects present at the last-named area.

Other objects of the invention will become apparent from the following description taken in conjunction with the accompanying drawings in which.

Figure 1:
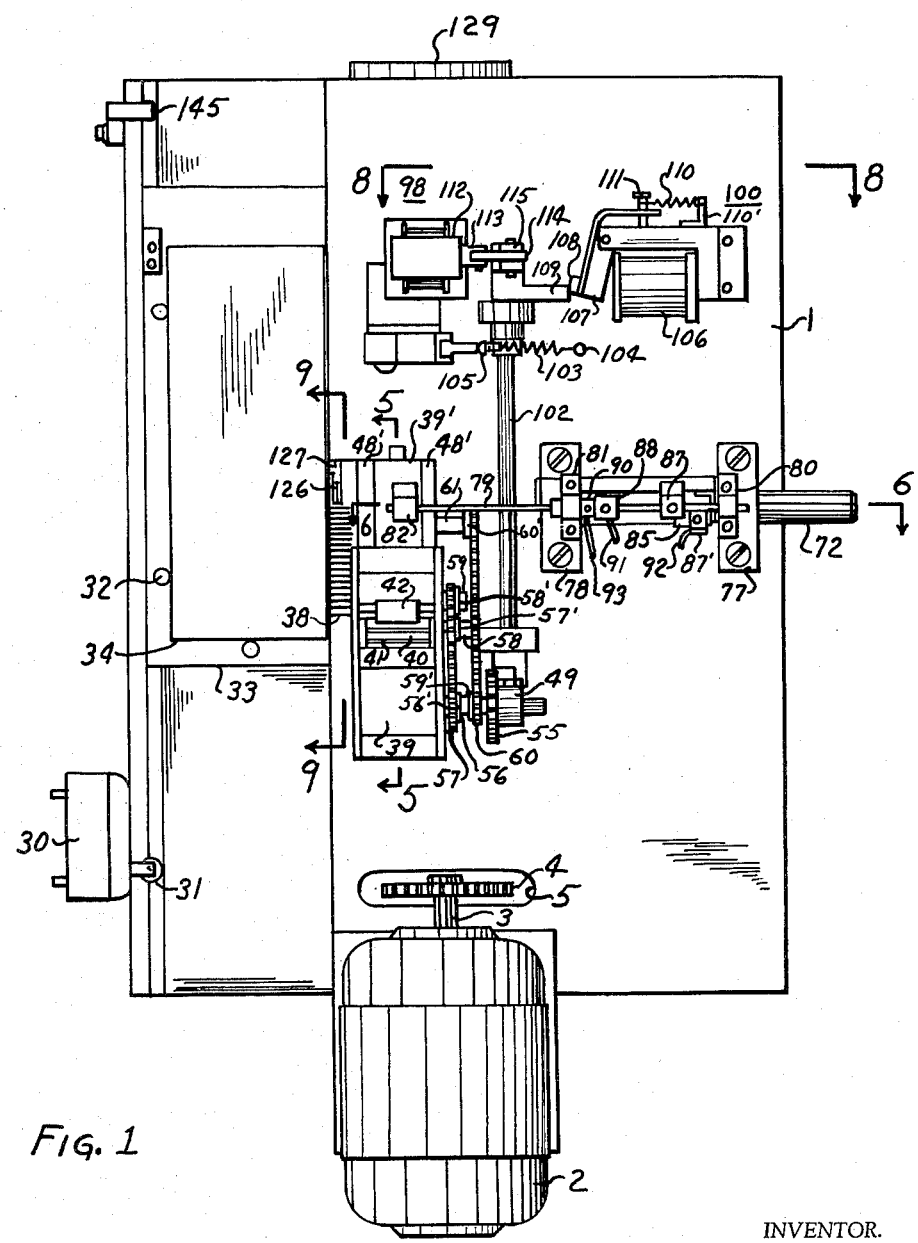
FIG. 1 is a view in top plan of a machine constructed in accordance with the invention.
Figure 2:
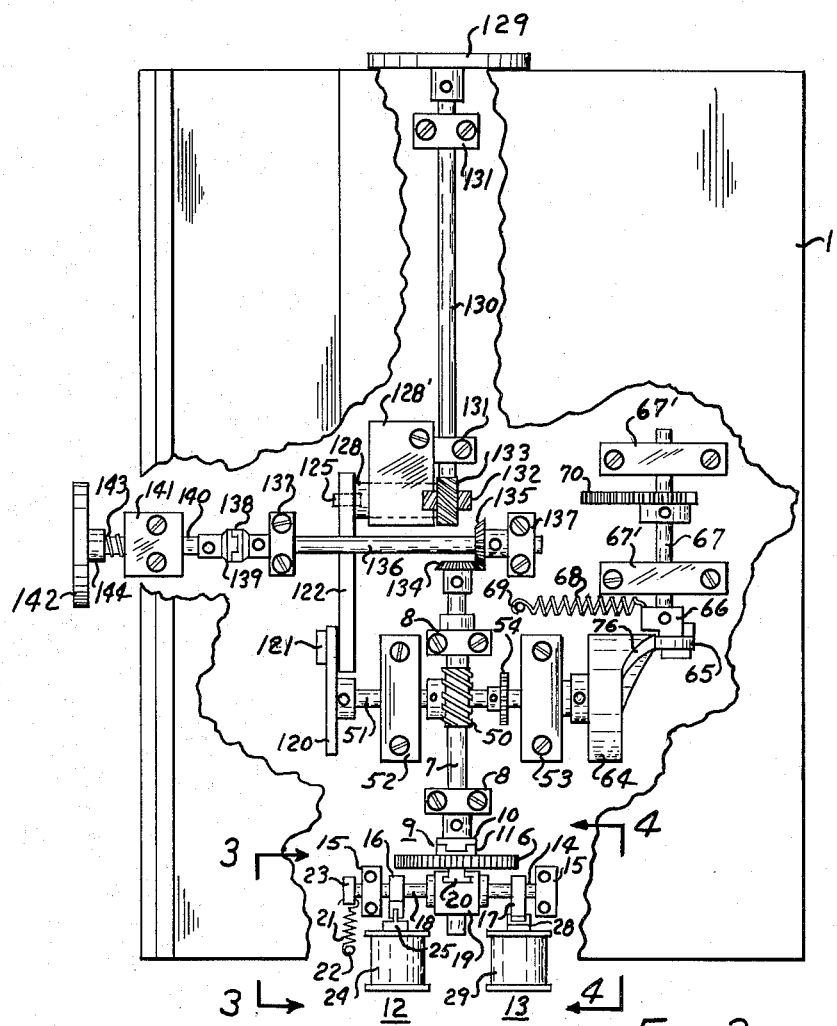
FIG. 2 is a view in top plan of the machine of FIG. 1 with parts broken away.
Figure 4:
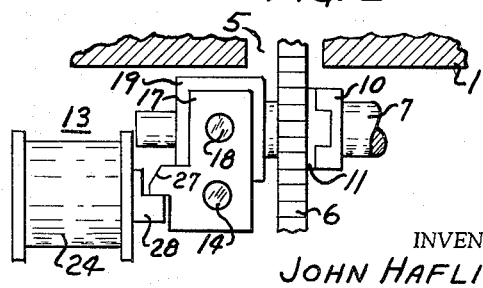
Figure 5:
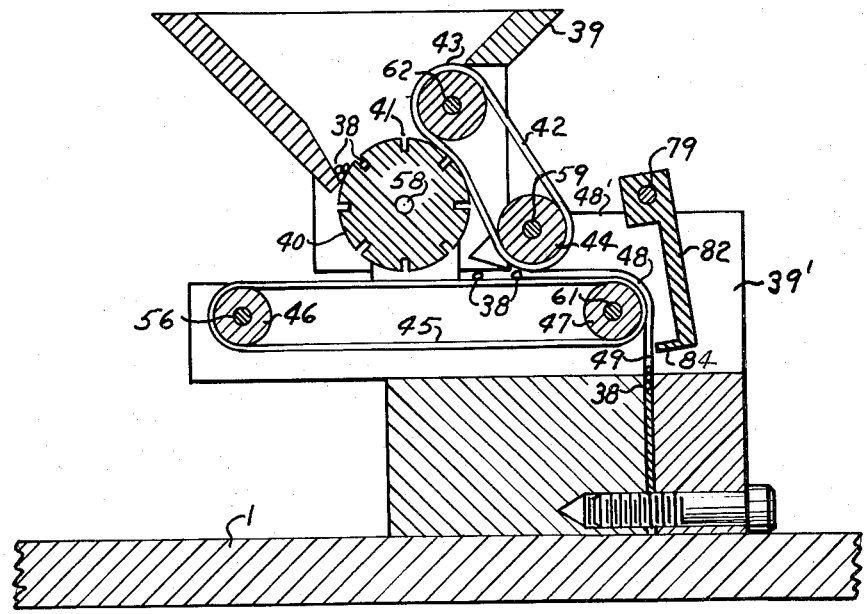
Figure 6:
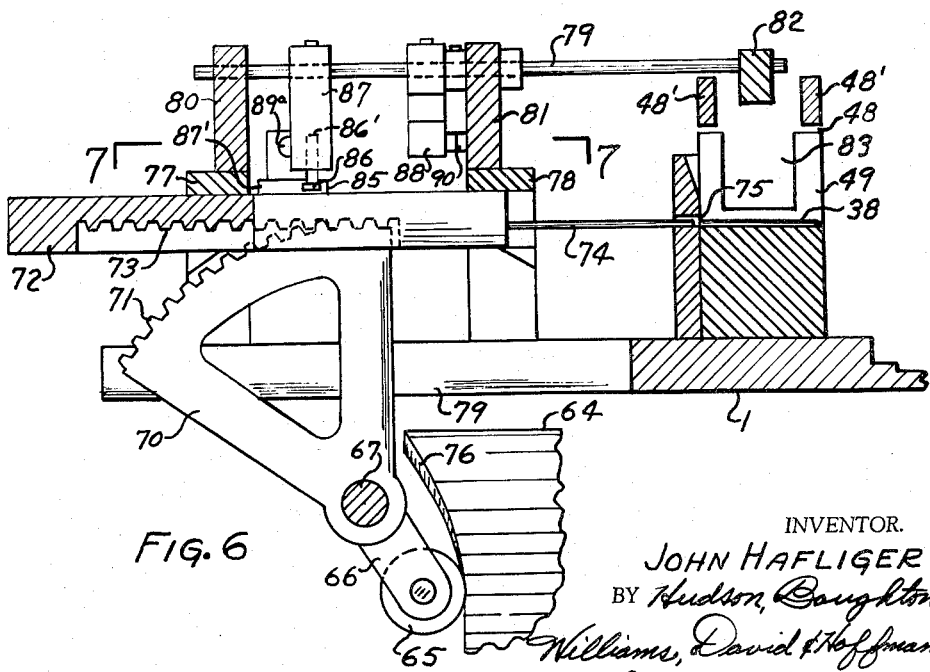

FIG. 4 is a view taken along the line of 4—4 of FIG. 2 with parts removed showing the device for disengaging the main clutch;

FIG. 5 is a view taken along the line 5—5 of FIG. 1 illustrating the hopper and feed means;

FIG. 6 is a view taken along the line 6—6 of FIG. 1 illustrating the pusher means;

FIG. 7 is a view taken along the line 7—7 of FIG. 6;

FIG. 8 is a view in elevation taken along the line 8—8 of FIG. 1 showing means for operating the feed means clutch;

FIG. 9 is a view taken along the line 9—9 of FIG. 1 showing the advancing means; and FIG. 10 is a schematic reprsentation of electrical circuits employed in the machine.

Although the machine of the present invention has many and varied applications, it will be described in connection with the insertion of faller bar pins into jigs preparatory to the application of the pins from the jigs to the faller bars.

Refering to the drawings, there is illustrated in FIGS. 1 and 2 a base member 1 for supporting the various mechanisms of the machine to be described. The base member 1 is mounted to extend horizontally by a suitable surface such as a work bench. Suitable legs may be applied to the base member so that the base member is spaced from the supporting surface sufficiently to accommodate various mechanisms carried by the base member on the underside thereof.

In order to drive the various mechanisms there is included a motor 2 of any suitable type having a drive shaft 3 to which a sprocket 4 is connected, as shown in FIG. 1. The sprocket 4 extends through a slot 5 of the base 1 and is provided with a chain, not shown, which is connected to a sprocket 6 shown in FIG. 2 loosely mounted on a main shaft 7 which is rotatably supported by spaced bearings 8. The shaft 7 extends horizontally beneath the base 1.

A suitable clutch is provided to control the connection of the shaft 7 and the motor 2. The clutch is illustrated as being of two-part construction including a part 10 secured to one end of the shaft 7 and a part 11 connected to the sprocket 6. For the purpose of operating the clutch 9 a pair of control devices 12 and 13 of any suitable construction are provided. In the specific embodiment illustrated the devices 12 and 13 are electrically energizable. The device 12 is effective when energized to engage the parts 10 and 11 of the clutch to permit rotation of the shaft 7 from the motor 2. The device 13 operates when energized to disengage the parts 10 and 11 to prevent rotation of the shaft 7 from the motor 2. Although the devices 12 and 13 may be of any suitable construction, specific constructions which may be employed are illustrated in FIGS. 3 and 4.

Figure 3:
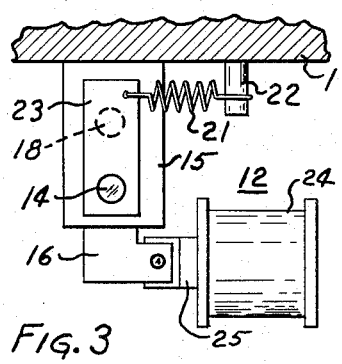
FIG. 3 is a view taken along the line 3—3 of FIG. 2 with parts removed showing the device for engaging the main clutch.

As shown in FIGS. 2, 3, and 4, the devices 12 and 13 are associated with a shaft 14 supported to extend transversely of and beneath the shaft 7. The shaft 14 is mounted for rotation by spaced bearings 15 and has secured thereto arms 16 and 17 associated respectively with the devices 12 and 13. These arms have openings for loosely receiving trunnions 18 which are carried by a yoke 19 loosely mounted on the shaft 7, and which extend parallel to the shaft 14 directly above the shaft 14 as viewed in FIGS. 3 and 4. The yoke 19 has a T-shaped slot for receiving a T-shaped projection 20 of the sprocket 6.

With the above described construction rotation of the shaft 14 causes the yoke 19 and sprocket 6 to slide along the shaft 7 to thereby move the part 11 with respect to the part 10. The part 11 is normally spaced from the part 10 by a spring 21 having ends secured respectively to a post 22 attached to the underside of the base 1 and to an arm 23 secured to the shaft 14.

The device 12 includes a solenoid 24 energizable to attract an armature 25 which is pivotally secured to the arm 16. When the armature 25 is attracted toward the solenoid 24, the shaft 14 is rotated in a counterclockwise direction as viewed in FIG. 3 to move the clutch part 11 into engagement with the part 10. The arm 17 of the device 13 includes a projection 27 which is normally biased into engagement with an armature 28 of a solenoid 29 of the device 13 under action of the spring 21 when the clutch 9 is engaged. When the solenoid 29 is energized the armature 28 is attracted thereto away from the projection 27 to permit rotation of the shaft 14 under action of the spring 21 to separate the parts 11 and 10.

The devices 12 and 13 are controlled by a suitable switch device 30 which is shown in FIG. 1 as including a displaceable switch actuating part 31 located in the path of a pin 32 mounted on a slide 33 which is carried by the base member 1. The slide 33 mounts a suitable support in the form of a book or jig 34 for movement with the slide in any suitable manner. As an example, the jig 34 may be clamped to the slide 33.

As will presently appear, jig 34 receives the faller bar pins in response to operation of the machine. When the pin setting operation is completed the slide 33 will be advanced from its position shown in FIG. 1 to a position displaced downwardly therefrom as viewed in FIG. 1 where the pin 32 engages the part 31 to actuate the switch 30. This actuation is effective to energize the solenoid 29 of the device 13 to disengage the parts 10 and 11 of the clutch 9. This action results in the disconnection of the shaft 7 from the motor 2 to terminate operation of the machine. As illustrated in FIG. 9, the jig 34 is of two part construction including an upper part 35 preferably of resilient construction supported by a lower part 36. The part 36 is provided with a number of spaced parallel notches 37 in its upper surface which are of substantially V-shaped cross-sectional area as shown in FIG. 9. The notches 37 are adapted to receive the pins 38 which are of elongated configuration as shown in FIG. 6.

The machine includes a storage hopper or receptacle 39 in which a quantity of the pins 38 may be deposited prior to the initiation of operation of the machine. As shown in FIG. 5, the receptacle 39 is of generally V-shaped cross-section and is secured to a supporting frame 39' which may be supported by the base 1. As illustrated in FIG. 5, one of the side walls of the receptacle 39 has an opening for receiving a pin selecting wheel 40 having a plurality of equally spaced slots 41 in its peripheral surface. The wheel 40 is mounted with its periphery in close proximity to the bottom edge of the opposite side wall of the receptacle. As the wheel 40 is rotated in a clockwise direction, as viewed in FIG. 5, pins in the receptacle are received in the slots 41 with each slot receiving a separate pin.

A flexible belt or band 42 surrounds a pair of spaced pulleys 43 and 44 to maintain the pins selected by the wheel 40 within the slots 41. It is noted that the belt 42 extends through the opening of the side wall of the receptacle such that the wheel 40 and belt 42 cooperate to close the opening for preventing pins from falling from the receptacle. The pulleys 43 and 44 are arranged to rotate in clockwise direction as viewed in FIG. 5.

In order to receive the pins from the wheel 40 there is provided a flexible band or belt 45 mounted by spaced pulleys 46 and 47 which rotate in clockwise direction as viewed in FIG. 5. The belt 45 is located beneath the wheel 40 to receive pins as they drop from the slots 41 in order to transport such pins horizontally in a right hand direction as viewed in FIG. 5 through a passage 48 formed in spaced parts 48' of the frame 39' which communicates with a vertical slot 49 in the frame. As the belt 45 moves the pins thereon drop into the slot 49 such that the pins are stacked vertically with their axes extending horizontally.

Any suitable means may be employed for driving the wheel 40 and the belts 42 and 45. The specific means utilized may now be described. Referring to FIG. 2, the shaft 7 includes a worm gear 50 in meshing relation with a worm wheel, not shown, on shaft 51 which extends transversely of and beneath the shaft 7. The shaft 51 is mounted for rotation in spaced bearings 52 and 53, and carries a sprocket 54 operatively connected to a sprocket 55, shown in FIG. 1, secured to a shaft 56 by a chain, not shown.

The shaft 56 carries a sprocket 56' which engages a chain 57 operatively connected to a sprocket 57' on shaft 58, which carries the wheel 40. The chain 57 also engages a sprocket 58', carried by a shaft 59 which also supports the pulley 44 of FIG. 5. The shaft 56 also carries a sprocket 59' which engages a chain 60 associated with a sprocket 60' on the shaft 61 which also carries the pulley 47 of FIG. 5. The pulley 43 is carried by shaft 62 which together with the shafts 56, 58, 59, 60 and 61 may be supported for rotation in the frame 39'. The arrangement is such that rotation of the shaft 3 in a counter-clockwise direction as viewed from the upper end of FIG. 1 results in clockwise rotation of the wheel 40 and the pulleys 43, 44, 46 and 47 as viewed in FIG. 5.

In order to eject pins from the slot 49 into the jig 34 the invention provides pusher means illustrated in FIGS. 2, 6 and 7. As will presently appear, the pusher means is operated in timed relation with the jig advancing means during the pin setting operation. The pusher means as illustrated in FIGS. 2 and 6 includes a cam 64 which is carried by the shaft 51 for rotation therewith. The cam 64 is associated with a follower 65 in the form of a rotatable wheel which follows a surface of the cam. The wheel 65 is rotatably secured to an arm 66 which is attached to a shaft 67 mounted in bearings 67', as shown in FIG. 2 to extend transversely of shaft 51. A spring 68 has its ends secured respectively to the arm 66 and to a post 69 carried by the base 1 for biasing the wheel 65 into engagement with the surface of the cam 64 which the wheel follows.

A sector gear 70 having a plurality of spaced teeth 71 is secured to the shaft 67 for rotation therewith in response to movement of the follower 65 resulting from rotation of the cam 64. The gear 70 is located beneath a horizontally mounted rack 72 having a plurality of spaced teeth 73 which are engageable with the teeth 71 of the gear 70. As the gear 70 is pivoted about the axis of the shaft 67 the teeth 71 and 73 become successively engaged to move the rack 72 along a horizontal axis. It is observed that the rack 72 supports a horizontally extending pusher rod 74 which projects into a slot 75 of the frame communicating with the slot 49. The arrangement is such that the pins are inserted into the jig so that the butt end of each pin projects outwardly from the jig as shown in FIG. 1.

The cam 64 is configured to have an axial length which varies as the cam is rotated about the axis of the shaft 51. For this purpose the cam is formed with a surface 76 on one end face adjacent the cam periphery which extends between points of minimum and maximum axial lengths of the cam. As illustrated in FIG. 6, the wheel 65 is positioned with its rim engaging the surface 76 and in FIG. 2 the wheel 65 is shown adjacent the point of maximum axial length of the cam. At this point the gear 70 has been rotated to advance the rack 72 so that the rod 74 is fully extended into the slot 49 after having pushed the lowermost pin from the slot 49 into the adjacent notch of the jig.

As the cam 64 rotates from its position of FIG. 2 the wheel 65 follows the surface 76 under action of the spring 68 from the point of maximum cam axial length to the point of minimum cam axial length, whereby the gear 70 is rotated to retract the rack 72 and the rod 74 to the positions shown in FIG. 6. The rack 72 is reciprocal in bearings 77 and 78 which may be supported by the base 1. It is noted that the gear 70 extends through a slot 79 of the base 1. The variable axial length of the cam 64 extends over only a preselected arc of the cam so that for a portion of each revolution of the cam there is no movement of the gear 70. During this portion the jig is being advanced by the advancing means as described hereinafter.

The cam 64 may be configured to provide desired speeds and distances of advancement and retraction of the rack 72. In addition, preselected different speeds of advancement and retraction may be obtained by suitable shaping of the cam 64. As an example, the cam may be shaped to effect a rate of retraction which is greater than the rate of advancement.

In order to control the number of pins delivered from the receptacle 39 to the slot 49 by the feed means the invention provides detector means effective to control operation of the feed means in accordance with the number of pins present in the slot 49. The machine is designed so that pins are fed to the slot 49 at a rate greater than the rate at which the pins are ejected from the slot 49. The detector means is effective to terminate operation of the feed means when the number of pins in the slot 49 exceeds a preselected number and to initiate operation of the feed means when the number of pins in the slot 49 is less than a preselected number. As an example, the detector means may terminate operation of the feed means when the number of pins exceeds five and may initiate operation of the feed means when the number of pins is less than four.

As shown in FIGS. 1, 6 and 7, the detector means includes a detector shaft 79 rotatable in spaced bearings 80 and 81 which may be carried by the bearings 77 and 78. The shaft 79 extends horizontally directly above the pusher rod 74 as viewed in FIG. 6 and carries at its outer end a feeler arm 82 which rotates with the shaft 79. As shown in FIG. 6, the arm 82 extends into a passage 83 which communicates with the slot 49. The arm 82 includes a terminal extension 84 as shown in FIG. 5 which moves relative to the slot 49 as the shaft 79 is rotated about its axis.

In the present invention the arm 82 is rotated in response to operation of the pusher means. In order to effect rotation of the shaft 79 and the arm 82 suitable cam means are provided including a cam 85 which is conveniently secured to the rack 72, as shown in FIGS. 1, 6 and 7. A cam follower 86 which may be in the form of a wheel is rotatably carried by a pin 86' supported by an arm 87 which is secured to the shaft 79 as illustrated in FIG. 6. The cam 85 is configured, as best shown in FIG. 7, to have an edge surface 87' which is curved between two portions of the cam having different width dimensions. The follower 86 is arranged to travel over the edge surface 87'.

When the rack 72 is moved toward the right, as viewed in FIG. 7, the follower 86 will follow the curved surface 87' of the cam 85 from the portion of greater width toward the portion of reduced width. By reason of the weight of the arms 87 and 82 this movement effects rotation of the shaft 79 in a counter-clockwise direction as viewed from the right of FIG. 6, and results in corresponding movement of the arm 82 and extension 84 toward the slot 49. If the extension 84 is capable of entering the slot 49 due to its failure to engage a pin indicating the absence of the required number of pins in the slot 49 continued displacement of the rack 72 and the cam 85 toward the right hand side of FIG. 6 will result in continued movement of the follower 86 along the curved cam surface so that the shaft 79 will be further rotated to such an extent that an electrical contact 88 carried by the shaft 79 will move with the shaft 79 into the path of a contact 89a which is secured to an electroconductive contact assembly 89' carried by the cam 85. Engagement of the contacts 88 and 89a resulting from continued movement of the rack 72 effects initiation of the feed means as will presently appear.

If the extension 84 is prevented from entering the slot 49 due to the engagement thereof with a pin indicating the presence of the required number of pins, rotation of the shaft 79 to the extent described above will be prevented with the result that a contact 89b carried by cam 85 will move with the rack 72 into engagement with a contact 90 which is secured to the shaft 79, and which is located in the path of contact 89b when the extension 84 engages a pin in slot 49. For this situation also the contact 88 will be displaced from the path of contact 89a so that contact 89a will pass by contact 88 without engaging contact 88. Also, when extension 84 does not engage a pin in slot 49, contact 90 is moved out of the path of contact 89b so that the contacts will not engage. Engagement of contacts 89b and 90 resulting from engagement of extension 84 with a pin will effect termination of operation of the feed means. The contacts 88 and 90 include sloping surfaces which assure a good contact with the contacts 89a and 89b.

In the event that the contacts 88 and 89a engage as a result of the detection of a lesser number of pins in the slot 49 than is required, an electrical circuit will be established through conductors 91 and 92 connected respectively to arm 88 and assembly 89' for energizing a clutch operating device 98 shown in FIGS. 1 and 8, which is effective to operate a clutch 99 of any suitable construction for initiating operation of the feed means. In the event, however, that the contact 89b engages the contact 90 as a result of an excessive number of pins in the slot 49, an electrical circuit will be established through conductor 91 and a conductor 93 connected to the arm 90 for energizing a device 100 shown in FIGS. 1 and 8 which operates the clutch 99 to terminate operation of the feed means. The devices 98 and 100 may be of any suitable construction. Specific constructions of the devices 98 and 100 which may be employed are illustrated in FIGS. 1 and 8.

As best shown in FIG. 1, the clutch 99 is associated with the shaft 56 and is controlled by means of a shaft 102 which is biased in a clockwise direction as viewed from the lower end of the shaft 102 in FIG. 1 by means of a spring 103 having ends secured respectively to a post 104 carried by the base and a screw 105 secured to the shaft 102. When the shaft 102 is rotated in such clockwise direction the clutch 99 will be disengaged to prevent operation of the feed means.

The clutch disengaging device 100 includes a solenoid 106 associated with an armature 107 which is pivotally mounted on a suitable frame and which has a projection 108 located under an extension 109 secured to the shaft 102 to prevent rotation of the shaft 102 in a direction for disengaging the clutch when solenoid 106 is de-energized. A spring 110 has one end secured to an extension 110' located on the frame of the device 100 and another end secured to a screw 111 carried by the armature 107. When the solenoid 106 is energized the armature 107 is attracted toward the right as viewed in FIG. 1, to remove the projection 108 from engagement with the extension 109, whereby the shaft 102 is free to rotate under action of the spring 103 for disconnecting the clutch 99.

The clutch engaging device 98 includes a solenoid 112 which is energized in response to the detection of an insufficient number of pins in the slot 49. When solenoid 112 is energized an associated armature 113 is moved to the right as viewed in FIG. 8 to pull therewith a link 114 pivotally connected to the armature 113 and to an arm 115 which is secured to the shaft 102. This action effects rotation of the arm 115 in a clockwise direction as viewed in FIG. 8 to rotate the shaft 102 in such direction which is effective to connect the clutch 99. This action also causes the extension 109 to assume its engaging position with respect to the projection 108 whereby rotation of the shaft 102 in a counterclockwise direction, as viewed in FIG. 8, is prevented so long as the solenoid 106 is de-energized.

In order to move the slide 33 and the jig 34 subsequent to each pushing operation for presenting a vacant one of the notches 37 to the pusher for receiving the next pin, the invention provides advancing means which is operable in timed relation with the pushing means to advance the jig the required distance. Details of construction of the advancing means are illustrated in FIGS. 2 and 9.

As best shown in FIG. 9, the advancing means includes a cam 120 secured to the shaft 51 for rotation therewith for engaging a cam follower 121 which may be in the form of a wheel rotatably secured to an arm 122 at the lower end thereof as viewed in FIG. 9. The follower 121 is biased into engagement with the peripheral surface of the cam 120 by means of a spring 123 having ends secured respectively to a lower portion 124 of the arm 122 and to the base member 1.

The arm 122 is of generally V-shaped configuration as shown in FIG. 9, and is mounted between its ends on a pin 125 so that the upper part 126 of the arm may be pivoted about the axis of the pin 125 a preselected amount in response to rotation of the cam 120. As shown in FIG. 9, the part 126 projects through an opening 127 of the base 1 so that when the part 126 is pivoted toward the left of FIG. 9 it will strike the projecting exposed portion of the previously inserted one of the pins 38 to thereby advance the slide 33 and the jig 34 in a preselected distance.

With reference to FIG. 9 it is observed that the cam 120 has a variable radius over an arc of substantially 180°. For the remaining substantially 180° arc the radius of the cam 120 is substantially constant. As a result, the part 126 of the arm 122 is being pivoted during one-half revolution of the cam 120 and is stationary for the remaining one-half revolution of the cam 120.

Assuming that the cam 120 is rotating in a counterclockwise direction as viewed in FIG. 9, the follower 121 has just passed over the part of the cam 120 having a decreasing radius whereby the part 126 has just moved to the right of FIG. 9, to a retracted position from a slide advancing position. After substantially one-half revolution of the cam 120 during which the arm 122 is stationary, the follower 121 will begin to travel over the portion of the cam of increasing radius to move the part 126 to the left of FIG. 9, to strike the pin 38 previously inserted for advancing the slide 33 and the jig 34. With such arrangement, it is noted that the slide and jig will not be advanced in the event that a pin 38 has not been inserted in the jig as a result of the previous pushing operation.

The advancing means is arranged so that the slide 33 is advanced a preselected distance to properly locate the next vacant one of the notches 37 to receive a pin during the following pushing operation. The cam 120 of the advancing means and the cam 64 of the pusher means are so proportioned and arranged on the shaft 51 that the proper sequence of operation is provided. For example, while the cam 64 is beginning to present its increasing axial length to the follower 65 to begin a pushing operation, the cam 120 has just completed presenting a decreasing radius to the follower 121 to terminate a slide advancing operation. As the cam 120 then presents its constant radius to the follower 121, the pushing operation is being performed and is terminated previous to the time when the cam 120 presents its increasing radius to the follower 121.

It is to be understood that the cam 120 may be configured to provide desired speeds of movement of the part 126. Also, different rates of movement of the part 126 in the left and right and directions as viewed in FIG. 9 may be obtained by suitable variation of the radius of cam 120.

In order to permit the employment of pins having different thickness dimensions and to permit the utilizaceiving notches the invention provides means for adjusting the slide advancing means to permit variation of the distance by which the slide may be advanced. For this purpose adjusting means are provided including a shaft 128, shown in FIGS. 2 and 9, as rotatable about a horizontal axis. This shaft may be supported for rotation in any suitable manner, such as by a bearing 128', and has secured thereto the pin 125 such that the pin 125 is eccentrically mounted with respect to the shaft 128, as viewed in FIG. 9. By adjusting the shaft 128 about its axis the pin 125 will be moved in an eccentric path to thereby shift the axis of pivotal movement of the part 126 of the arm 122. This is effective to shift the position of the arc of movement of the part 126, but does not alter the length of such arc.

Any suitable means may be employed to rotate the shaft 128. In a preferred embodiment of the invention the adjustment is performed by manually rotating a knob 129, shown in FIG. 2, which is secured to a shaft 130 rotatable in spaced bearings 131. The lower end of the shaft 130 as viewed in FIG. 2, has secured thereto a helical gear 132 which meshes with a helical gear 133 secured to the shaft 128. Consequently, by rotating the knob 129 rotation of the shaft 128 is effected to perform the required adjustment. Conveniently, the knob 129 may have indicia thereon to indicate the amount of rotation necessary to provide a desired adjustment. It has been observed that an adjustment may be provided which is capable of varying the distance of advancement of the slide over a range of .005 inch to .080 inch.

The invention also provides means for rotating the main shaft 7 independently of the motor 2 to release any mechanisms of the machine which may have become jammed for any reason during operation of the machine. For this purpose the shaft 7 carries a bevel gear 134, as shown in FIG. 2, which meshes with another bevel gear 135 secured to shaft 136 which is journalled in spaced bearings 137. A clutch is provided including an element 138 secured to the shaft 136 and a cooperating element 139 secured to a shaft 140 which is aligned with the shaft 136 for rotation in a bearing block 141. The shaft 140 has secured to its outer end a knob 142. A spring 143 is mounted on the shaft 140 between the block 141 and a projection 144 of the knob 142 to normally bias the shaft 140 to the left, as viewed in FIG. 2, whereby the clutch elements 138 and 139 are disengaged.

In order to permit operation of the release mechanism it is necessary to energize the solenoid 29 to disengage the clutch 9 to terminate rotation of the shaft 7 by the motor 2. The knob 142 may then be actuated to push the shaft 140 toward the right, as viewed in FIG. 2, to engage the clutch elements 138 and 139 to permit subsequent rotation of the shaft 136 by rotation of the knob 142. This action then allows rotation of the shaft 7 in either direction by an amount sufficient to release the jammed mechanism.

In operation, an operator positions a selected jig on the slide 33 and secures it thereto in any suitable manner, such as by clamping. The slide 33 is then adjusted on the base 1 such that its upper end, as viewed in FIG. 1, engages the stop 145. The jig is then in a position to receive the first one of the pins 38. At this time the knob 129 may be actuated to provide the proper adjustment of the advancing mechanism as previously described. The operator may then place a desired quantity of pins into the receptacle 39 positioned so that the pin axes extend horizontally with the points of the pins extending away from the observer as viewed in FIG. 5.

In order to initiate operation of the machine the operator closes a normally open switch 146, as shown in FIG. 10. This action is effective to energize the solenoid 24, which is connected across conductors 147 which may be energized from any suitable source of electrical voltage. Energization of solenoid 24 engages the clutch 9 to condition the shaft 7 for rotation in response to energization of the motor 2.

The next step involves the closing of a switch 148 to effect energization of the motor 2, which is connected across the conductors 147. Closing of the switch 148 results in rotation of the shaft 7 to initiate the various operations. The feed mechanism operates to feed the pins 38 from the receptacle 39 into the slots 49, as previously described. Before any pins are received in the slots 49 the pusher and advancing mechanisms are operating but the pusher mechanism is ineffective to insert a pin into the jig and consequently the jig will not be advanced by the advancing mechanism. During this time the detector means is detecting an insufficient quantity of pins and consequently operates to energize the device 98 to maintain operation of the feed means. When the first pin is inserted into the jig the next succeeding advancing operation is effective to move the jig as previously described.

The sequence of operation continues until the slide 33 strikes the member 31, at which time the pin setting operation is completed and the switch 30 is closed to energize the solenoid 29, which is connected across the conductors 147, as shown in FIG. 10. This then terminates rotation of the shaft 7 to stop operation of the machine.

A switch 149 is provided which is connected in parallel relation with the switch 30 to permit energization of the solenoid 29 independently of the switch 30. The switch 149 is preferably manually actuatable to permit an operator to stop the machine in the event of an emergency such as jamming of one of the mechanisms.

A switch 150 is connected in series relation with the solenoid 112, to permit disconnection of the solenoid 112 from the circuit 147 so that the solenoid 112 will not be repeatedly energized during the times when the feed means is operating.

Although the invention has been described with reference to certain specific embodiments thereof, numerous modifications are possible, and it is desired to cover all modifications falling within the spirit and scope of the invention.

Having thus described my invention, I claim:

1. In a machine for applying objects to a support member in predetermined spaced relation, feed means operable to feed said objects to an area wherein the objects are arranged in alignment in a predetermined direction, pusher means operable to successively push said objects from said area along a first axis substantially transverse to the direction of alignment into engagement with said support member, advancing means operable in timed relation with said pusher means to advance said support member a preselected distance subsequent to each pushing operation along a second axis substantially transverse to said first axis, and detector means including a detecting part movable in response to each pushing operation of the pusher means to control operation of said feed means in accordance with the number of objects at said area.

2. In a machine for applying objects to a support member in predetermined spaced relation, feed means operable to feed said objects to an area wherein the objects are arranged in alignment in a predetermined direction, pusher means operable to successively push said objects from said area along a first axis substantially transverse to the direction of alignment into engagement with said support member, advancing means operable in timed relation with said pusher means to advance said support member a preselected distance subsequent to each pushing operation along a second axis substantially transverse to said first axis, and detector means operable in response to operation of said pusher means to terminate operation of said feed means upon the detection of a number of objects at said area greater than a preselected number, and to initiate operation of said feed means upon the detection of a number of objects at said area less than a preselected number, said detector means including a detecting part mounted for pivotal movement about an axis substantially parallel to said first axis.

3. In a machine for applying objects to a support member in predetermined spaced relation, feed means operable to feed said objects to an area wherein the objects are arranged in alignment in a predetermined direction, pusher means operable to successively push said objects from said area along a first axis substantially transverse to the direction of alignment into engagement with said support member, advancing means operable in timed relation with said pusher means to advance said support member a preselected distance subsequent to each pushing operation along a second axis substantially transverse to said first axis, and means adjustable to permit variation of the distance of advancement of said support member effected by operation of said advancing means.

4. In a machine for applying objects to a support member in predetermined spaced relation, drive means, feed means operable from said drive means to feed said objects to an area wherein the objects are arranged in alignment in a predetermined direction, pusher means operable from said drive means to successively push said objects from said area along a first axis substantially transverse to the direction of alignment into engagement with said support member, advancing means operable from said drive means to advance said support member a preselected distance subsequent to each pushing operation along a second axis substantially transverse to said first axis, and manually actuatable means independent of said drive means adjustable to permit variation of the distance of advancement of said support member effected by operation of said advancing means.

5. In a machine for inserting pins in a support member in predetermined spaced relation, shaft means, motor means having a rotatable drive shaft for rotating said shaft means, a hopper for storing said pins, feed means operable from said shaft means to feed said pins from said hopper to an area wherein the pins are vertically stacked with their length dimensions extending horizontally, pusher means including a pusher rod operable from said shaft means to successively engage and push the lowermost pin from said area along a first horizontal axis into engagement with said support member, and advancing means operable from said shaft means to advance said support member a preselected distance subsequent to each pushing operation along a second horizontal axis transverse to said first horizontal axis, said advancing means being arranged such that said support member is advanced only in response to the reception of a pin by the support member resulting from the preceding pushing opertion.

6. In a machine for inserting pins in a support member in predetermined spaced relation, shaft means, motor means effective when energized to rotate said shaft means, a hopper for storing said pins, feed means operable from said shaft means to feed said pins from said hopper to an area wherein the pins are vertically stacked with their length dimensions extending horizontally, pusher means including a pusher rod operable from said shaft means to successively push the lowermost pin from said area along a first horizontal axis into engagement with said support member, advancing means operable from said shaft means to advance said support member a preselected distance subsequent to each pushing operation along a second horizontal axis transverse to said first horizontal axis, and detector means including a feeler arm movable into and out of said area in response to operation of said pusher means to control operation of said feed means in accordance with the number of pins at said area.

7. In a machine for inserting pins in a support member in predetermined spaced relation, shaft means, motor means effective when energized to rotate said shaft means, a hopper for storing said pins, feed means operable from said shaft means to feed said pins from said hopper to an area wherein the pins are vertically stacked with their length dimensions extending horizontally, pusher means including a pusher rod operable from said shaft means to successively push the lowermost pin from said area along a first horizontal axis into engagement with said support member, advancing means operable from said shaft means to advance said support member a preselected distance subsequent to each pushing operation along a second horizontal axis transverse to said first horizontal axis, and manually actuatable means independent of said shaft means adjustable to permit variation of the distance of advancement of said support member effected by operation of said advancing means.

8. In a machine for inserting pins in a support member in predetermined spaced relation, shaft means, motor means effective when energized to rotate said shaft means, a hopper for storing said pins, feed means operable from said shaft means to feed said pins from said hopper to an area wherein the pins are vertically stacked with their length dimensions extending horizontally, pusher means including a pusher rod operable from said shaft means to successively push the lowermost pin from said area along a first horizontal axis into engagement with said support member, and advancing means operable from said shaft means to advance said support member a preselected distance subsequent to each pushing operation along a second horizontal axis transverse to said first horizontal axis, said advancing means including an operating member engageable with the pin received by said support member as a result of the preceding pushing operation to advance the support member.

9. In a machine for inserting pins in a support member in predetermined spaced relation, shaft means, motor means effective when energized to rotate said shaft means, a hopper for storing said pins, feed means operable from said shaft means to feed said pins from said hopper to an area wherein the pins are vertically stacked with their length dimensions extending horizontally, pusher means including a pusher rod operable from said shaft means to successively push the lowermost pin from said area along a first horizontal axis into engagement with said support member, advancing means operable from said shaft means to advance said support member a preselected distance subsequent to each pushing operation along a second horizontal axis transverse to said first horizontal axis, and manually actuatable means independent of said motor means to effect rotation of said shaft means.

10. In a machine for applying objects to a support member in predetermined spaced relation, a main shaft, a motor effective when energized to rotate said main shaft, a main clutch actuatable to connect and disconnect said main shaft and said motor, a pair of main clutch actuating devices, an auxiliary shaft rotatable in response to rotation of said main shaft, feed means operable in response to rotation of said auxiliary shaft to feed said objects to an area wherein the objects are stacked, pusher means including a first cam carried by said auxiliary shaft to successively push said objects from said area into engagement with said support member, advancing means including a second cam carried by said auxiliary shaft to advance said support member a preselected distance subsequent to each pushing operation, first switch means actuatable in response to a preselected distance of advancement of said support member to energize one of said main clutch actuating devices for actuating the main clutch to disconnect the main shaft and motor, and second switch means actuatable to energize the other of said main clutch actuating devices for actuating the main clutch to connect the main shaft and motor.

11. In a machine for applying objects to a support member in predetermined spaced relation, a main shaft, a motor effective when energized to rotate said main shaft, a main clutch actuatable to connect and disconnect said main shaft and said motor, a pair of main clutch actuating devices, an auxiliary shaft rotatable in response to rotation of said main shaft, feed means operable in response to rotation of said auxiliary shaft to feed said objects to a preselected area wherein the objects are stacked, an auxiliary clutch actuatable to initiate and terminate operation of said feed means, a pair of auxiliary clutch actuating devices, pusher means including a first cam carried by said auxiliary shaft to successively push said objects from said area into engagement with said support member, advancing means including a second cam carried by said auxiliary shaft to advance said support member a preselected distance subsequent to each pushing operation, first switch means actuatable in response to a preselected distance of advancement of said support member to energize one of said main clutch actuating devices for actuating the main clutch to disconnect the main shaft and motor, second switch means actuatable to energize the other of said main clutch actuating devices for actuating the main clutch to connect the main shaft and motor, and detector means operable upon the detection of a number of objects at said area greater than a preselected number to energize one of said auxiliary clutch actuating devices for actuating the auxiliary clutch to terminate operation of the feeding means, and operable upon the detection of a number of objects at said area less than a preselected number to energize the other of said auxiliary clutch actuating devices for actuating the auxiliary clutch to initiate operation of the feeding means.

12. In a machine for applying objects to a support member in predetermined spaced relation, a main shaft, a motor effective when energized to rotate said main shaft, a main clutch actuatable to connect and disconnect said main shaft and said motor, a pair of main clutch actuating devices, an auxiliary shaft rotatable in response to rotation of said main shaft, feed means operable in response to rotation of said auxiliary shaft to feed said objects to a preselected area wherein the objects are stacked, pusher means including a first cam carried by said auxiliary shaft to successively push said objects from said area into engagement with said support member, advancing means including a second cam carried by said auxiliary shaft to advance said support member a preselected distance subsequent to each pushing operation, first switch means actuatable in response to a preselected distance of advancement of said support member to energize one of said main clutch actuating devices for actuating the main clutch to disconnect the main shaft and motor, second switch means actuatable to energize the other of said main clutch actuating devices for actuating the main clutch to connect the main shaft and motor, and manually actuatable means including a spindle operatively connected to said main shaft rotatable to effect rotation of the main shaft independently of the motor.

13. In a machine for inserting pins into a support member in predetermined spaced relation, means for positioning a plurality of pins to extend along vertically spaced horizontal first axes, pusher means including a pusher rod movable along a second axis parallel to said first axis for successively inserting the lowermost pin into the support member, and advancing means including an operating member movable to engage the previously inserted pin for advancing said support member a preselected distance subsequent to each pushing operation.

14. In a machine for applying objects to a support member in predetermined spaced relation, feed means operable to feed said objects to an area wherein the objects are arranged in alignment in a predetermined direction, pusher means operable to successively push said objects from said area along an axis substantially transverse to the direction of alignment into engagement with said support member, and detector means including a feeler arm movable into and out of the area in response to operation of the pusher means to control operation of said feed means in accordance with the number of objects at said area.

15. In a machine for applying objects to a support member in predetermined spaced relation, feed means operable to feed said objects to an area wherein the objects are arranged in alignment in a predetermined direction, pusher means operable to successively push said objects from said area along an axis substantially transverse to the direction of alignment into engagement with said support member, and detector means including a feeler arm movable into and out of the area in response to operation of said pusher means to terminate operation of said feed means upon the detection of a number of objects at said area greater than a preselected number, or to initiate operation of said feed means upon the detection of a number of objects at said area less than a preselected number.

16. In a machine for applying objects to a support member in predetermined spaced relation, feed means operable to feed said objects to an area wherein the objects are arranged in alignment in a predetermined direction, pusher means operable to successively push said objects from said area along an axis substantially transverse to the direction of alignment into engagement with said support member, and detector means including a shaft pivotal about an axis parallel to said pushing axis, a feeler arm carried by the shaft for movement therewith, cam means movable in response to operation of said pusher means to pivot the shaft about its axis for moving said arm relative to said area, and electrical contacts carried by said cam means and said shaft for selective engagement in accordance with the degree of movement of said arm for controlling operation of said feed means.

17. In a machine for applying objects to a support member in predetermined spaced relation, shaft means, a motor for continuously rotating said shaft means about a horizontal first axis, feed means operable to feed said objects to an area wherein the objects are vertically stacked, a first cam carried by the shaft means for rotation therewith, pusher means including a pusher rod movable along a second axis generally parallel to said first axis in response to rotation of the first cam to successively push said objects from said area into engagement with said support member, a second cam carried by said shaft means for rotation therewith, and advancing means operable in response to rotation of the second cam to advance said support member a preselected distance subsequent to each pushing operation along a horizontal third axis generally perpendicular to said first and second axes.

18. In a machine for inserting faller bar pins into spaced openings of a book, means for supporting a book so that the openings of the book when supported are spaced along a horizontal first axis, a hopper for storing said pins, feed means operable to feed said pins from said hopper to an area wherein the pins are arranged in vertically stacked relation, pusher means including a pusher rod movable along a horizontal second axis generally perpendicular to the first axis to successively engage and push the lowermost pin from said area into an opening of said book, and advancing means operable in timed relation with said pusher rod to advance said book subsequent to each pushing operation along a horizontal third axis generally parallel to said first axis a distance equal to the spacing between adjacent openings of the book, said advancing means including an operating member movable to engage the previously inserted pin for advancing the book.

19. In a machine for inserting faller bar pins into spaced openings of a book, a slide for supporting a book so that the openings of the book when supported are spaced along a horizontal first axis, said slide being movable along a second axis parallel to said first axis, a hopper for storing said pins, feed means operable to feed said pins from said hopper to an area wherein the pins are arranged in vertically stacked relation, pusher means including a pusher rod movable along a horizontal third axis generally perpendicular to the first axis to successively engage and push the lowermost pin from said area into an opening of said book, advancing means operable in timed relation with said pusher rod to advance said book and the slide therewith subsequent to each pushing operation along said second axis a distance substantially equal to the spacing between adjacent openings of the book, switch means effective when actuated to terminate operation of said feed means, pusher means and advancing means, and means on said slide for actuating said switch means when the book and slide have been advanced subsequent to insertion of a pin into the last opening of the book.

References Cited in the file of this patent
UNITED STATES PATENTS

| | | |
|---|---|---|
| 2,312,060 | Kimball | Feb. 23, 1943 |
| 2,505,427 | Peterson | Apr. 25, 1950 |
| 2,711,275 | Bartlett | June 21, 1955 |
| 2,864,214 | Koehler et al. | Dec. 16, 1958 |